(12) United States Patent
Grzegorzewska et al.

(10) Patent No.: US 9,048,573 B2
(45) Date of Patent: Jun. 2, 2015

(54) INDUSTRIAL INTERCONNECT SYSTEM INCORPORATING TRANSCEIVER MODULE CAGE

(75) Inventors: Barbara Grzegorzewska, Harrisburg, PA (US); Thomas R. Marrapode, Naperville, IL (US); Bogdan Andrei, Lisle, IL (US); David S. Rifkin, Aurora, IL (US)

(73) Assignee: Molex Incorporated, Lisle, IL (US)

( * ) Notice: Subject to any disclaimer, the term of this patent is extended or adjusted under 35 U.S.C. 154(b) by 527 days.

(21) Appl. No.: 11/990,613

(22) PCT Filed: Aug. 15, 2006

(86) PCT No.: PCT/US2006/031883
§ 371 (c)(1),
(2), (4) Date: Apr. 7, 2009

(87) PCT Pub. No.: WO2007/022207
PCT Pub. Date: Feb. 22, 2007

(65) Prior Publication Data
US 2009/0202207 A1 Aug. 13, 2009

(51) Int. Cl.
*G02B 6/36* (2006.01)
*H01R 13/625* (2006.01)
(Continued)

(52) U.S. Cl.
CPC ............ *H01R 13/625* (2013.01); *H01R 13/508* (2013.01); *H01R 13/514* (2013.01); *H01R 13/5202* (2013.01); *H01R 13/5205* (2013.01);
(Continued)

(58) Field of Classification Search
CPC ..................................... G02B 6/36; G02B 6/00
USPC ........................................................ 385/53, 56
See application file for complete search history.

(56) References Cited

U.S. PATENT DOCUMENTS 5,224,187 A   6/1993 Davisdon
5,542,015 A * 7/1996 Hultermans ................... 385/60
(Continued)

FOREIGN PATENT DOCUMENTS

EP    0 097 575 A1   1/1984
EP    0 638 828 A1   2/1995
(Continued)

OTHER PUBLICATIONS

International Search Report of the International Application No. PCT/US06/031883.
(Continued)

*Primary Examiner* — Kaveh Kianni

(57) ABSTRACT

An interconnect system (30, 100) includes a transceiver module assembly (105) that is mountable in an industrial receptacle (28, 103). The receptacle mates to an industrial optical connector (34) to form an environmentally sealed connection. The receptacle has an interior passageway (143, 162) and mating means (124) for attaching the module assembly. The module assembly includes a spring-loaded module cage (50) for receiving active devices (48), such as SFP transceivers. The spring-loaded module cage can adjust its position within the receptacle to accommodate different type of modules from various vendors. When attached to the platform, the module assembly is positioned so that the cage's open end is accessible through the receptacle's passageway. Users have the option of plugging/unplugging the transceiver module either through the passageway or by removing the module assembly from the receptacle.

6 Claims, 15 Drawing Sheets

(51) Int. Cl.
*H01R 13/508* (2006.01)
*H01R 13/514* (2006.01)
*H01R 13/52* (2006.01)
*H01R 13/74* (2006.01)
*H01R 31/06* (2006.01)
*G02B 6/42* (2006.01)
*G02B 6/38* (2006.01)

(52) U.S. Cl.
CPC ........ *H01R 13/5213* (2013.01); *H01R 13/5219* (2013.01); *H01R 13/746* (2013.01); *H01R 31/065* (2013.01); *G02B 6/3891* (2013.01); *G02B 6/3893* (2013.01); *G02B 6/4292* (2013.01)

(56) References Cited

U.S. PATENT DOCUMENTS

| | | | |
|---|---|---|---|
| 5,671,310 A | 9/1997 | Lin et al. | |
| 5,748,819 A | 5/1998 | Szentesi et al. | |
| 5,764,834 A | 6/1998 | Hultermans | |
| 5,915,056 A | 6/1999 | Bradley et al. | |
| 5,943,462 A | 8/1999 | Schofield et al. | |
| 6,533,470 B2 * | 3/2003 | Ahrens | 385/88 |
| 6,551,117 B2 * | 4/2003 | Poplawski et al. | 439/92 |
| 6,599,151 B2 | 7/2003 | Chiran et al. | |
| 6,778,399 B2 | 8/2004 | Medina et al. | |
| 6,796,715 B2 | 9/2004 | Chiu et al. | |
| 6,816,376 B2 * | 11/2004 | Bright et al. | 361/704 |
| 6,878,872 B2 | 4/2005 | Crane et al. | |
| 6,905,257 B2 * | 6/2005 | Eichenberger et al. | 385/89 |
| 7,073,957 B2 * | 7/2006 | Schunk et al. | 385/92 |
| 7,215,554 B2 | 5/2007 | Torres et al. | |
| 7,281,856 B2 * | 10/2007 | Grzegorzewska et al. | 385/53 |
| 7,296,937 B1 * | 11/2007 | Bright et al. | 385/92 |
| 7,350,979 B2 * | 4/2008 | Mizue et al. | 385/53 |
| 2002/0057870 A1 | 5/2002 | Dean, Jr. et al. | |
| 2003/0036340 A1 | 2/2003 | Moriya et al. | |
| 2003/0044122 A1 | 3/2003 | Lee | |
| 2003/0044129 A1 * | 3/2003 | Ahrens et al. | 385/92 |
| 2003/0091295 A1 * | 5/2003 | Cheng | 385/76 |
| 2003/0133667 A1 * | 7/2003 | Chiu et al. | 385/53 |
| 2003/0152331 A1 * | 8/2003 | Dair et al. | 385/59 |
| 2003/0161108 A1 * | 8/2003 | Bright et al. | 361/707 |
| 2004/0033027 A1 | 2/2004 | Pang et al. | |
| 2004/0037517 A1 * | 2/2004 | Dair et al. | 385/92 |
| 2004/0161207 A1 * | 8/2004 | Chiu et al. | 385/88 |
| 2004/0208459 A1 * | 10/2004 | Mizue et al. | 385/92 |
| 2005/0013548 A1 | 1/2005 | Chiu et al. | |
| 2005/0041407 A1 | 2/2005 | Torres et al. | |
| 2005/0089280 A1 * | 4/2005 | Kumar et al. | 385/88 |
| 2005/0157474 A1 | 7/2005 | Larson | |
| 2005/0157987 A1 * | 7/2005 | Dodds et al. | 385/92 |
| 2005/0286838 A1 * | 12/2005 | Oki et al. | 385/92 |
| 2006/0140552 A1 * | 6/2006 | Mizue et al. | 385/92 |
| 2006/0204183 A1 * | 9/2006 | Ishikawa | 385/88 |
| 2007/0036489 A1 * | 2/2007 | Grzegorzewska et al. | 385/88 |
| 2007/0258682 A1 * | 11/2007 | Bright et al. | 385/55 |
| 2008/0227318 A1 | 9/2008 | Classen et al. | |

FOREIGN PATENT DOCUMENTS

| | | |
|---|---|---|
| EP | 1 020 743 A2 | 7/2000 |
| EP | 1 258 758 A2 | 11/2002 |
| EP | 1 566 674 A1 | 8/2005 |
| WO | 92/19998 A1 | 11/1992 |
| WO | 94/19716 A1 | 9/1994 |
| WO | 01/59499 A1 | 8/2001 |
| WO | WO 2004/088381 | 10/2004 |
| WO | WO 2005/064751 | 7/2005 |
| WO | 2005/101078 A1 | 10/2005 |

OTHER PUBLICATIONS

Written Opinion of the International Searching Authority for International Application No. PCT/US06/031883.
International Search Report for PCT/US06/048493.
Office Action for U.S. Appl. No. 11/204,132, filed Aug. 15, 2005 (US Publication No. 2007/0036489, published Feb. 15, 2007).

* cited by examiner

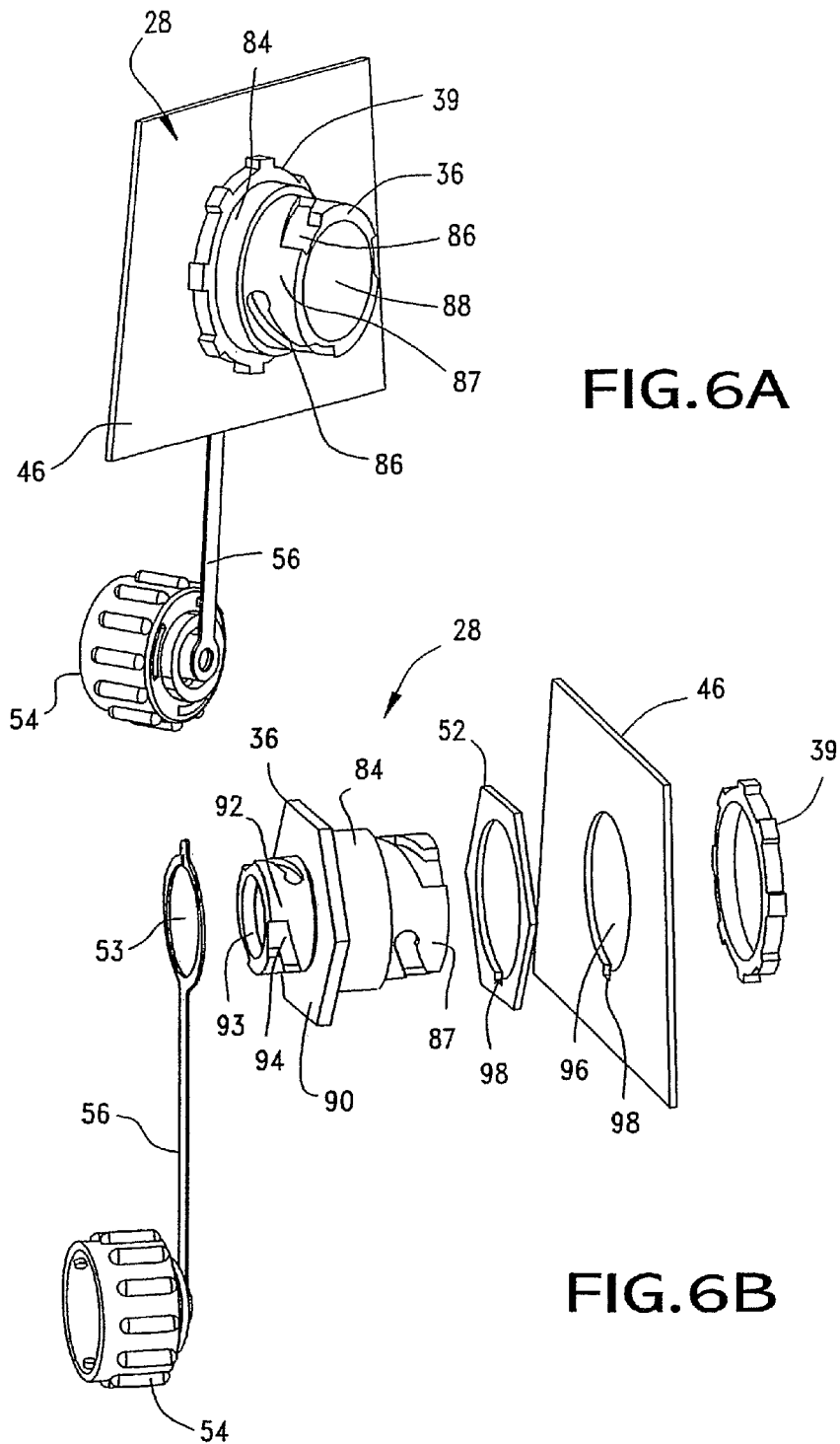

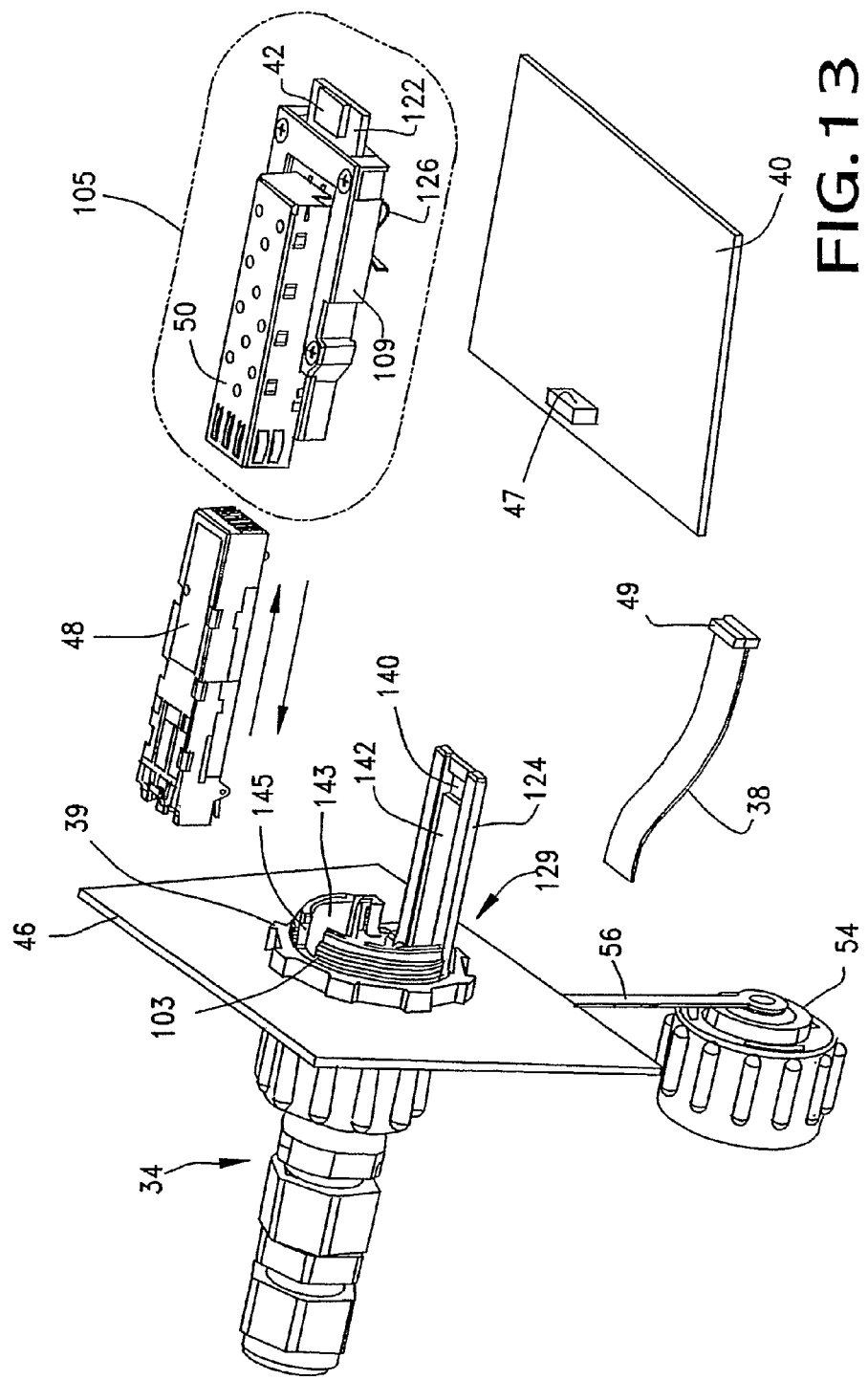

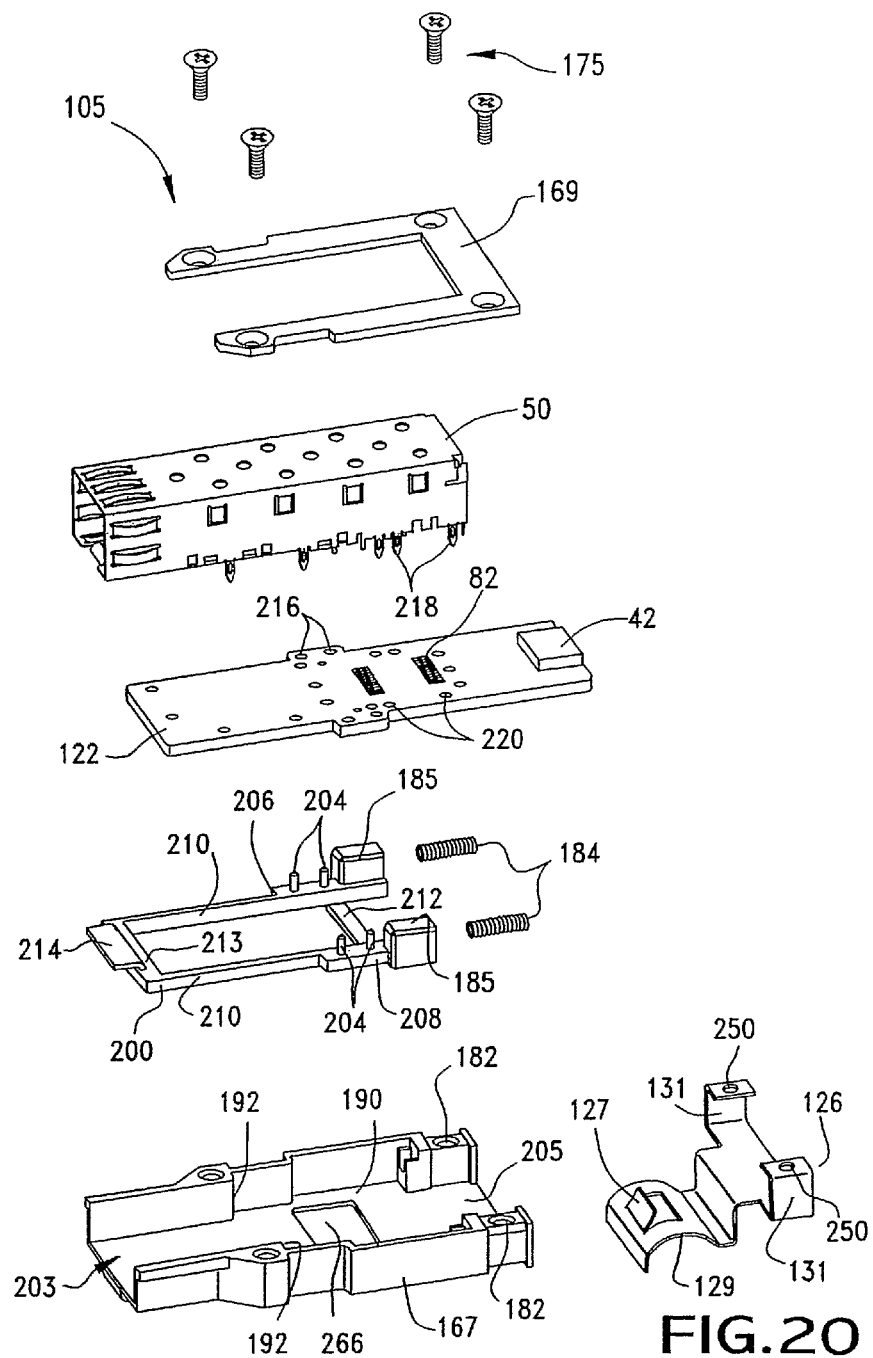

INDUSTRIAL INTERCONNECT SYSTEM INCORPORATING TRANSCEIVER MODULE CAGE

RELATED APPLICATION

This application is a national phase of PCT Application No PCT/US2006/031883, filed Aug. 15, 2006, which in turn claims priority to U.S. application Ser. No. 11/204,132, filed Aug. 15, 2005, now abandoned, and which is related to U.S. patent application Ser. No. 11/311,501, titled "Industrial Optical Fiber Connector Assembly", filed on the same date as the parent application and owned in common by the assignee hereof. The related application is fully incorporated herein by reference as though set forth in full.

TECHNICAL FIELD

The present invention relates generally to optical and electrical connectors, and more specifically, to industrial connector systems designed to incorporate active devices, such as pluggable transceivers.

BACKGROUND

Electro/optic transceiver modules conventionally include light emitting and light receiving elements that perform photoelectric conversion to provide bidirectional transmission of data between an electrical interface and an optical fiber.

Pluggable transceiver modules are a special type of transceiver designed to be detachably attached inside a cage mounted on a printed circuit board (PCB). Electrical contacts are formed on the PCB within the cage to provide the electrical interface to the transceiver. Light is coupled into and out of the transceiver via a plug receptacle that is arranged on the transceiver and into which an optical connector can be plugged. The transceiver thus constructed enables optical communication by converting an optical signal transmitted to and received from the optical fiber into an electric signal transmitted to and received from the PCB.

A desirable characteristic of pluggable transceivers is that their designs assure relative ease of installation/removal in the field. It is highly desirable that a transceiver module be capable of being installed or removed in a relative short period of time without the necessity of special skills or dexterity on the part of the installer.

Increasingly popular are pluggable transceivers of a small construction, known as Small Form-Factor Pluggable (SFP) transceivers. Standards for SFP transceivers are set forth in the "Small Form-Factor Pluggable (SFP) Transceiver Multi-source Agreement (MSA)," which is hereby incorporated by reference. The SFP MSA standardizes the shapes and sizes of the SFP transceivers and their cages to establish compatibility between optical transceivers of various vendors. Standards for a 10 gigabit/second SFP, known as the XFP, are set forth in the XFP MSA Specification, which is hereby incorporated by reference.

In industrial applications, there is an increasing need for the high data bandwidth offered by fiber optic systems. Unfortunately, conventional pluggable transceivers, particularly standard SFP transceivers, are not designed to operate under the harsh environmental conditions found in many industrial settings. Indeed, if such transceivers are exposed to extreme environments, they are likely to become unreliable due to moisture and/or contamination. To avoid this, the transceiver, its cage, connectors and host PCB are typically placed in an environmentally sealed housing or behind a sealed panel to insolate against the elements. Doing this makes it inconvenient and time consuming to plug/unplug the transceiver module because the housing or panel must first be removed in order to access the transceiver.

In view of the foregoing, there is a need for a ruggedized, environmentally-sealed system that allows fiber optic communications and pluggable transceiver modules to be more conveniently employed in harsh operating environments.

SUMMARY

It is an advantage of the present invention to provide an improved interconnect system that fulfills the above-described needs. The interconnect system is specifically designed to protect cable connections and transceiver modules in harsh operating environments, while offering improved accessibility to transceiver connections and greater flexibility in connecting to host PCBs.

In accordance with the embodiments of the invention, as described infra, an interconnect system includes a transceiver module cage that is located in an industrial receptacle. The receptacle is adapted for mating to an industrial connector to form an environmentally-sealed connection, which protects the cage and any inserted transceiver module.

Placing the module cage and transceiver module inside the interconnect, instead of on a host PCB, as is conventionally done, not only protects the transceiver module, but also provides improved module accessibility, saves equipment PCB space and allows greater flexibility in equipment PCB layout.

Other aspects, features, embodiments, processes and advantages of the invention will be or will become apparent to one with skill in the art upon examination of the following figures and detailed description. It is intended that all such additional features, embodiments, processes and advantages be included within this description, be within the scope of the invention, and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

FIGS. 6A-B are perspective and exploded views, respectively, of the industrial receptacle shown in FIGS. 1-3.

FIG. 13 is a perspective view of the interconnect system of FIGS. 8-10, illustrating a second procedure for removing/inserting the transceiver module.

FIG. 20 is a complete exploded view of the of the module assembly of FIGS. 17A-D.

DETAILED DESCRIPTION

Figure 1:
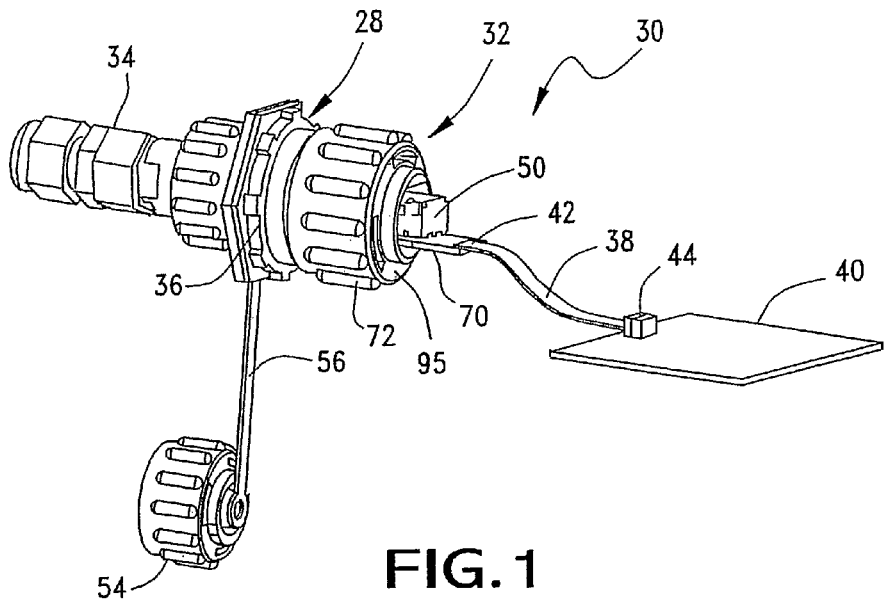
FIG. 1 is a perspective view of an interconnect system in accordance with a first exemplary embodiment of the present invention.

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

The interconnect systems 30,100 described below combine the high performance of optical connections with the versatility of rugged, lower-cost industrial connectors to allow for easy installations and terminations in harsh environments. The interconnect systems 30,100 feature push-pull insertion and bayonet-style mechanical latches to ensure an environmentally sealed connections in one step. The interconnect systems 30,100 are designed for use in harsh environments, particularly where the Ethernet protocol is used. They are suitable for use in manufacturing facilities, water treatment plants, industrial plants, transportation hubs, high electromagnetic interference (EMI) and radio frequency interference (RFI) areas, medical equipment applications, telecommunications/CATV applications, such as FTTx connections, mobile broadcasting, and the like.

Each interconnect system 30,100 includes a transceiver module assembly that is mountable in an industrial receptacle. The receptacle has an interior passageway and mating means for attaching the module assembly so that is accessible through the passageway. The module assembly includes an attachment for releasably attaching the assembly to the mating means. The module assembly also includes a spring-loaded mount having a movable member, a printed circuit board (PCB) mounted to the movable member, and a module cage attached to the PCB. These components cooperate together to form a spring-loaded module cage. The spring-loaded module cage has an enclosed space with an open end adapted to receive a transceiver module. Being spring-loaded, the module cage can adjust its position within the receptacle to accommodate dimensional differences in the optical and mechanical planes of different modules from various vendors.

The improved interconnect systems 30,100 provide a number of advantages. Among other things, they provide weather-tight, Small Form-factor Pluggable (SFP) compatible interconnects that house electro/optic converter (transceiver) modules that work with standard SFP interfaces and duplex LC-type cable assemblies. Placing the transceiver module inside the interconnect, instead on a printed circuit board (PCB), as is done traditionally, frees up space on the PCB and gives PCB designers greater flexibility in their layouts.

The interconnect systems 30,100 are also designed to allow field technicians to easily plug/unplug the transceiver modules into/from the interconnect systems 30,100. To improve accessibility, the disclosed embodiments feature a detachable module cage assembly. By incorporating a detachable module assembly, the interconnects 30,100 permit technicians to access the module cage from either the front side or back side of a panel.

In addition, to ensure greater compatibility with available modules, the interconnects 30,100 each include a spring-loaded SFP cage to accommodate the dimensional differences between the mechanical and optical planes of multiple module types and vendors. Further, the interconnect systems 30,100 are preferably made of conductive materials and include a conductive gasket to provide EMI protection.

Turning now to the drawings, and in particular to FIG. 1, there is illustrated a perspective view of a mated interconnect system 30 in accordance with a first embodiment of the present invention. The interconnect system 30 includes an LC-SFP integrated industrial receptacle assembly 28 and an LC-SFP cage module assembly 32 designed to accommodate active devices (e.g., LC-SFP transceiver modules) in rugged environments. The removable module assembly 32 is shown mounted in the receptacle assembly 28. Also included in the system is an optical LC duplex connector 34 that mates to the receptacle assembly 28 to form an environmentally sealed connection.

The receptacle assembly 28 includes a bulkhead receptacle 36 that has an interior passageway formed therethrough and mating surfaces and attachments for receiving both the connector 34 and the module assembly 32. Further details of the receptacle assembly 28 are provided in connection with FIGS. 6A-B.

The module assembly 32 includes an attachment means, such as a coupling ring 72, for releasably attaching the assembly 32 to the bulkhead receptacle 36. To provide a spring-loaded SFP cage 50, the module assembly 32 also includes a spring-loaded mount 97 having a movable member 74 (See FIG. 5B), a module printed circuit board (PCB) 70 mounted to the movable member and a module cage 50 attached to the module PCB 70. The module cage 50 and PCB 70 are configured to receive SFP transceiver modules. By spring-loading the SFP cage 50, the interconnect system 30 can accommodate differences in the mechanical and optical planes of multiple module types and vendors.

The module PCB 70 provides an electrical interface to the SFP transceiver module 48. Electrical contacts 82 (See FIG. 5D) formed on the upper surface of the PCB 70 are positioned in accordance with SFP transceiver standards to complete contact with an inserted module 48.

A flexible electrical conductor 38 connects to the module PCB 70 to complete the electrical connection between the inserted module 48 and a second, external PCB 40, such as a customer's equipment PCB. Tracks formed on the PCB 70 provide conductive paths between the module contacts and the conductor 38. The conductor 38 can be any suitable electrical conductor, and is preferably a flex board capable of carrying high frequency signals. The conductor 38 can be attached to the module PCB 70 using any suitable means, including direct soldering, or alternatively, using an electrical connector 42 so that the conductor 38 can be conveniently detached from the PCB 70.

An electrical host connector 44 on the PCB 40 provides a two-piece electrical connector 47,49 (with connector 47 being fastened to the board 40) so that the conductor 38 can be easily detached from the PCB 40. Alternatively, the conductor 38 can be permanently connected to the board 40 by soldering or any other suitable means.

The optical connector 34 can be any suitable optical connector, including the environmentally-sealed duplex LC-type connector disclosed in the related U.S. patent application Ser. No. 11/204,128, titled "Industrial Optical Fiber Connector Assembly,", now abandoned, or related U.S. patent application Ser. No. 11/311,501, titled "Industrial Optical Fiber Connector Assembly,", which issued on 16 Oct. 2007 as U.S. Pat. No. 7,281,856.

Figure 3:
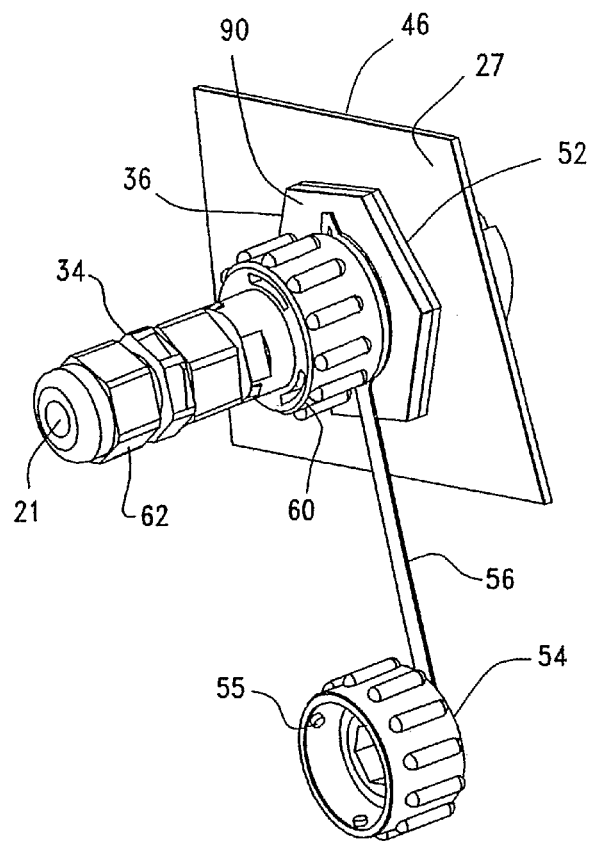
FIG. 3 is a second perspective view of the interconnect system shown in FIG. 1.

The dust cap assembly includes a tether 56 and a dust cap 54 for protecting the exterior side 92 of the receptacle 36 and covering its exterior opening 93 (See FIG. 6B) when the interconnect system 30 is not in use. As shown in FIG. 3, the dust cap 54 includes bayonet locks 55 for engaging the bayonet channels 94 of receptacle housing 36 (See FIG. 6B).

The dust cap 54 is preferably made of a thermoplastic material, so as to be light weight and durable. This part may be fabricated using any number of suitable methods, but it is preferably molded using well known injection molding techniques.

Figure 2:
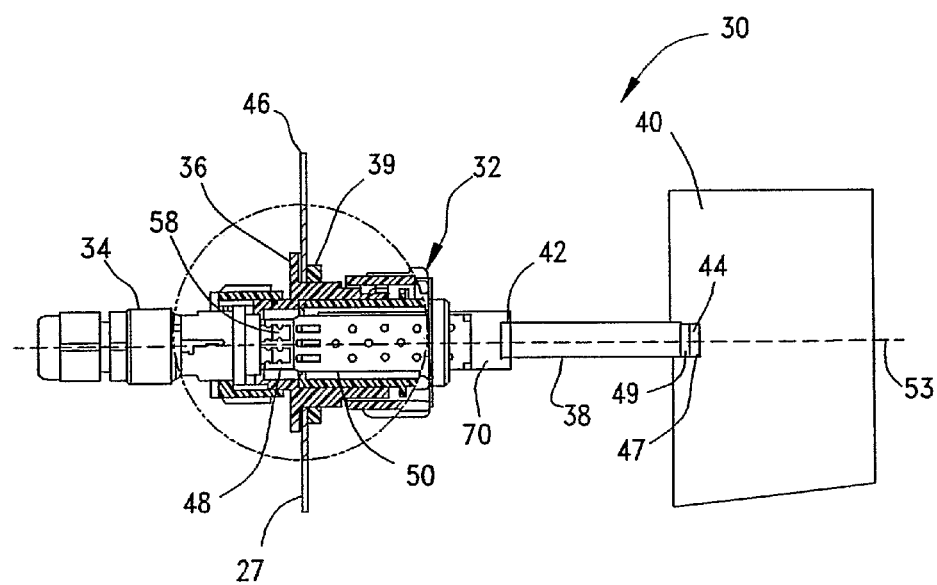
FIG. 2 is a top-down partial cross-sectional view of the interconnect system shown in FIG. 1.

FIG. 2 is a top-down partial cross-sectional view of the mated interconnect system 30, mounted in a panel thru-hole to form an environmentally sealed system with the panel 46. The connection is sealed against harsh environmental elements that may exist beyond the exterior side 27 of the panel 46. The cross-sectional portion of FIG. 2 reveals a commercially-available duplex LC-SFP transceiver module 48 inserted into the module cage 50 and terminating the two side-by-side LC optical connectors 58 of the sealed optical connector 34. Also shown is the cross-section of a lock nut 39 for securing the bulkhead receptacle 36 to the panel 46.

FIG. 3 is a perspective view of the interconnect system 30 from the panel exterior, with the module assembly 32 and PCB 40 disconnected. The exterior side of the receptacle 36 provides a flange 90 abutted to a conductive gasket 52 fitted around the exterior of the receptacle 36. The gasket 52 provides environmental sealing between the receptacle 36 and the equipment panel 46. The conductive nature of the gasket 52 also provides EMI protection.

The removable connector 34 provides sealing between both the receptacle mating surface and the cable exit 21 from the connector 34. A commercially-available cable sealer 62 is incorporated in the connector 34 to seal the cable (not shown).

The connector 34 includes a coupling ring 60 for conventional bayonet-style lock latching for attaching the connector 34 to the receptacle 36. The bayonet-style locking design can be configured to meet industry-standard sealed connector specifications, such as IP67.

Figure 4:
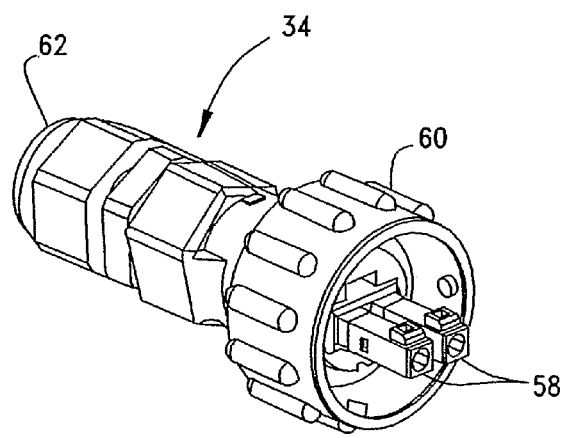
FIG. 4 is a perspective view of the optical connector of FIGS. 1-3, unmated from the industrial receptacle.

FIG. 4 is a perspective view of the optical connector 34, unmated from the industrial receptacle 36. The connector 34 is a duplex LC-type optical connector conforming to industry standards for duplex LC-type connections. It is preferably the environmentally sealed duplex LC-type connector disclosed in the related U.S. patent application Ser. No. 11/204,128, titled "Industrial Optical Fiber Connector Assembly,", now abandoned, or related U.S. patent application Ser. No. 11/311,501, titled "Industrial Optical Fiber Connector Assembly,", which issued on 16 Oct. 2007 as U.S. Pat. No. 7,281,856.

As shown in FIG. 4, the connector 34 includes two side-by-side optical connectors 58 for terminating a pair of optical fibers. Each terminating connector 58 has an essentially square cross-section with the dimensions (a cross-section approximately 5 mm from side to side) and mating characteristics of a standard LC connector, as defined by the Fiber Optic Connector Intermateability Standard—Type LC, ANSI TIA/EIA 604-10A.

Figure 5A:
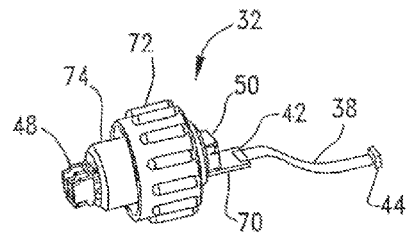
FIGS. 5A-D present several views illustrating details of the module assembly of FIGS. 1-2.
Figure 5B:
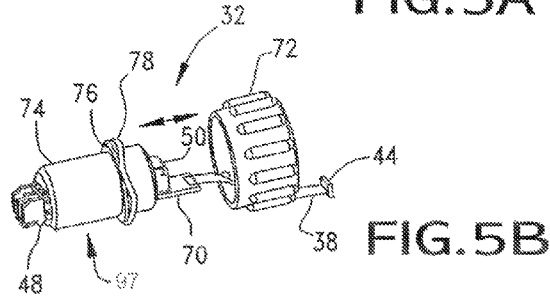
Figure 5C:
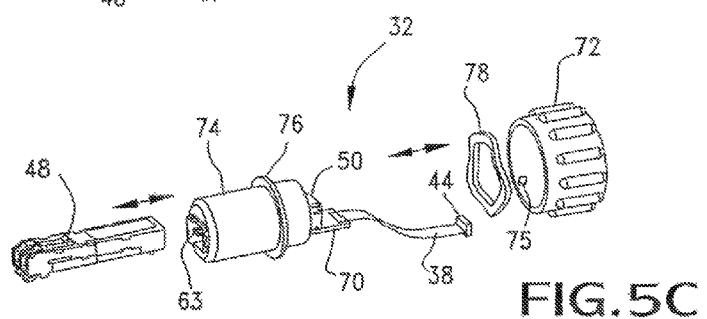

FIGS. 5A-D present several views illustrating details of the module assembly 32 of FIGS. 1-2. FIG. 5A shows a fully assembled module assembly 32. Within the assembly 32, the module cage 50 and the PCB 70 form an enclosed space with an open end 63 adapted to receive the transceiver module 48 (FIG. 5C).

The assembly 32 includes the coupling ring 72 having a thru-hole fitted around the movable member 74. The coupling ring 72 permits conventional bayonet-style lock latching for attaching the module assembly 32 to the receptacle 36. The coupling ring 72 includes lugs 75 that permit a conventional bayonet-style latch attachment to receptacle 36. The bayonet-style locking design can be configured to meet industry-standard connector specifications.

FIG. 5B shows the coupling ring 72 removed from the spring-loaded mount 97. The spring-loaded mount 97 includes the movable member 74 and a spring washer 78, such as a wave washer.

The movable member 74 is a cylindrically-shaped housing having a rectangular passageway 80 formed through it for securely receiving the assembled module cage 50 and PCB 70. An annular flange 76 extends from the exterior surface of the housing, forming a stop for the spring washer 78. When the coupling ring 72 is placed over the housing and connected to the receptacle 36, the interior surface of an annular back wall 95 (FIG. 7A) of the ring 72 traps the spring washer 78 against the flange 76 so that the spring washer 78 provides a biasing force against the housing flange 76. When the module assembly 32 and receptacle 36 are mated together, the biasing force pushes the movable member 74 toward the optical connector 34, but it allows the member 74 to move away from the connector 34, along the longitudinal axis 53 of the system 30, with a spring-loaded action. This configuration is advantageous because it allow the system 30 to accommodate multiple transceiver modules having different optical and/or mechanical planes.

Figure 5D:
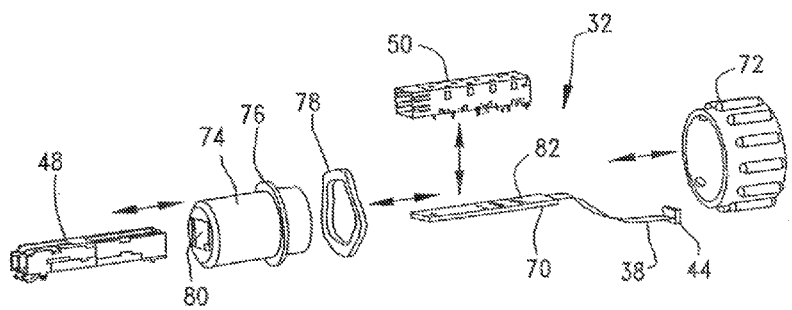

FIG. 5D shows a fully exploded view of the module assembly 32. The module cage 50 is made of stamped metal and has lower legs for soldering to the PCB 70.

The receptacle 36 and movable member 74 are preferably made of a conductive material, such as a die cast metal, for forming an electrically conductive path between the panel 46, gasket 52, receptacle 36, module cage 50, and spring-loaded mount 97. This construction provides a ground path for EMI protection.

FIGS. 6A-B are perspective and exploded views, respectively, of the industrial receptacle assembly 28 shown in FIGS. 1-3. The receptacle assembly 28 includes the bulkhead receptacle 36, locknut 39, gasket 52, and dust cap 54 and tether 56. The tether 56 includes an opening 53 fitted to the circumference of an exterior portion 92 of the bulkhead receptacle 36. The receptacle assembly 28 has a sealed panel feed-thru design for ease of installation into enclosures and equipment panels. It can be mounted directly into a panel cutout 90 to serve as a sealed feed-thru.

The bulkhead receptacle 36 has formed therein an interior circular opening 88 configured and sized to snuggly receive the movable member 74. The opening 88 connects to a passage through the receptacle 36 that opens at the other end of receptacle 36 as the exterior circular opening 93 (See FIG. 6B). The exterior opening 93 is configured and sized to receive the optical connector 34 against it mating surface so as to form an environmental seal.

The receptacle 36 includes a threaded surface 84 and an exterior bayonet mount portion 92 and an interior bayonet portion 87. The bayonet portions 87,92 of the receptacle 36 provide conventional bayonet-style locking channels 86,94 for attaching the module assembly 32 and optical connector 34, respectively. The bayonet-style locking design can be configured to meet industry-standard sealed connector specifications. The lock channels 86,94 are preferably integrally formed into the receptacle 36, making them more robust.

The receptacle 36 is attached to the panel 46 by inserting the threaded portion 84 through the panel hole 90 and tightening down the receptacle bulkhead 36 with the lock nut 39. The gasket 52 provides environmental sealing between the receptacle 36 and the equipment panel 46. The panel thru-hole 90 and gasket 52 each include an alignment notch 98 for aligning the receptacle 36 in the panel opening 90.

Figure 7A:
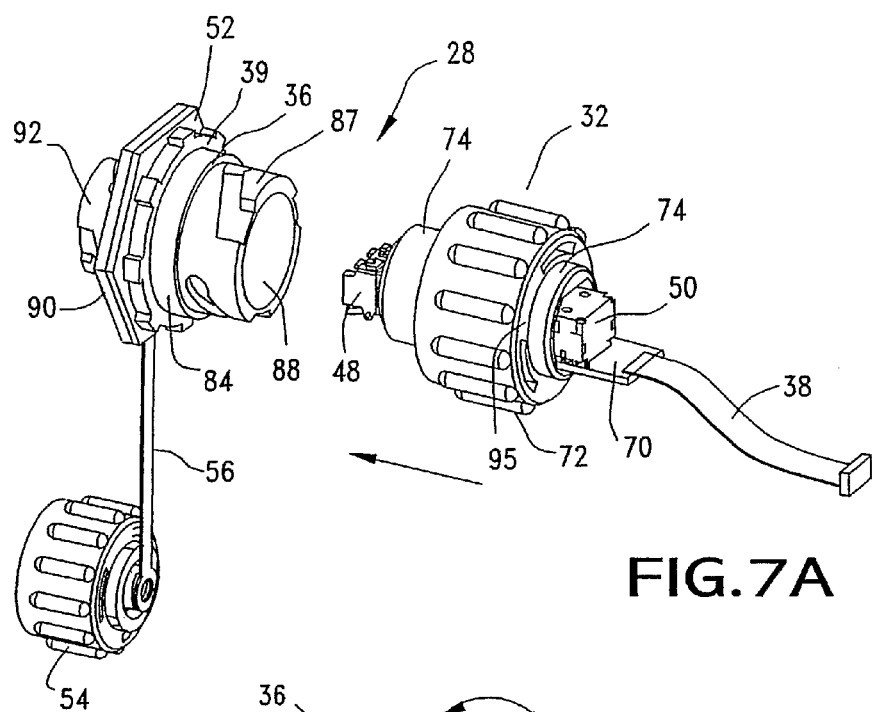
FIGS. 7A-B are perspective views showing the mated receptacle and module assembly of the first exemplary embodiment.
Figure 7B:
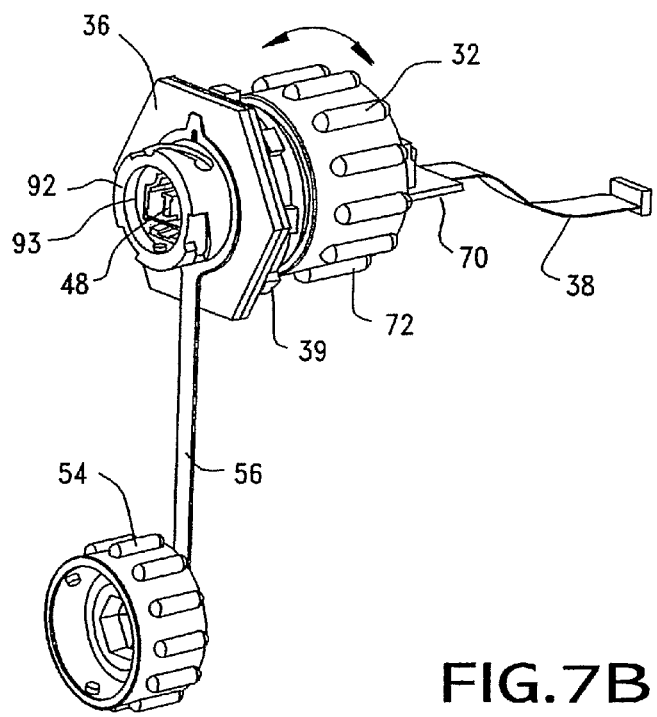

FIGS. 7A-B are perspective views showing the mating of the receptacle and module assemblies 28,32 of the first exemplary embodiment. When the module assembly 32 is removed from the receptacle assembly 28, as shown in FIG. 7A, the transceiver module 48 can be plugged or unplugged by a technician. This permits a technician to change out the module 48 from the back side of the panel 46, without having to remove the optical connector 34. Alternatively, when the assemblies 28,32 are mated, as shown in FIG. 7B, the module 48 can be plugged/unplugged through the receptacle opening 93. This allows a technician to change out the module 48 from the front side 27 of the panel 46 by simply removing the optical connector 34. Thus, with this interconnect system 30, field technicians have the option of conveniently plugging/unplugging the transceiver module 48 from either the front or back side of the panel 46.

Figure 8:
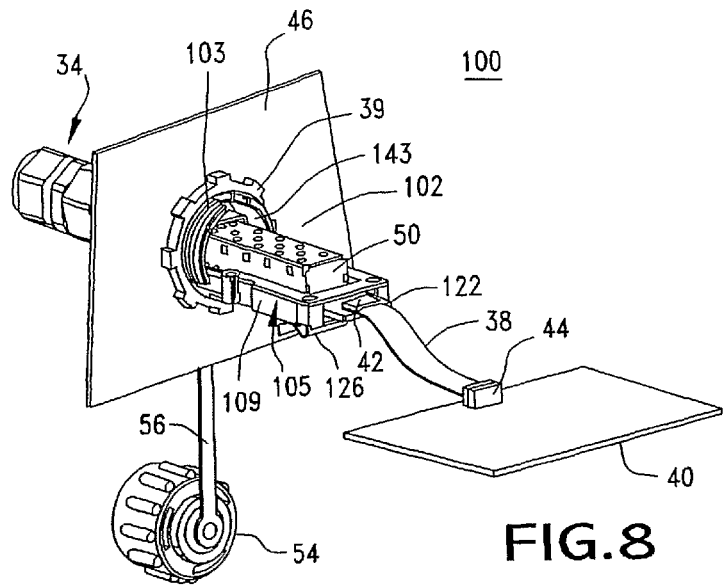
FIG. 8 is a perspective view of a mated interconnect system in accordance with a second exemplary embodiment of the present invention.
Figure 9:
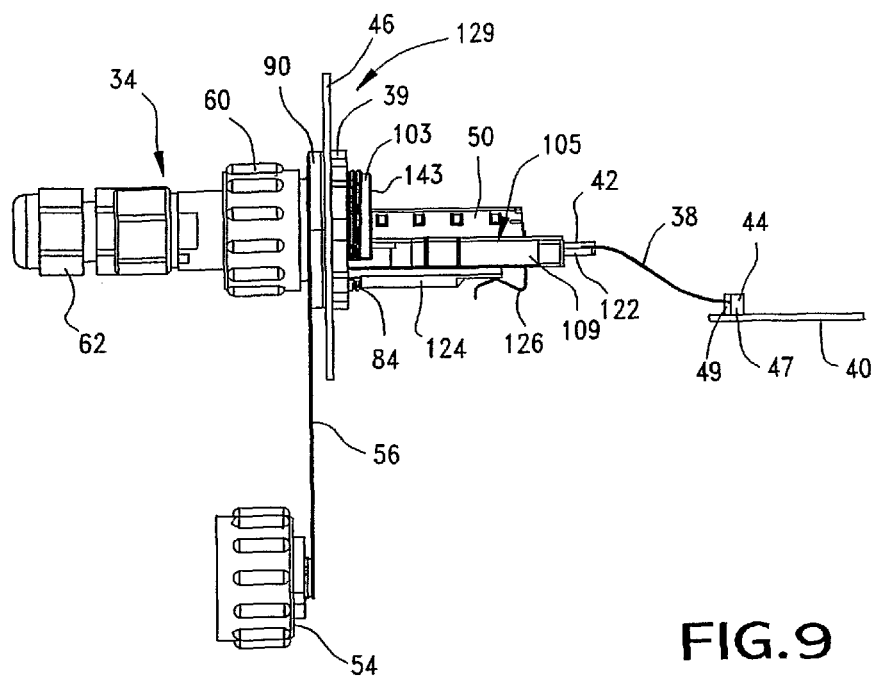
FIG. 9 is a side view of the mated interconnect system shown in FIG. 8.

FIG. 8 is a perspective view of a mated interconnect system 100 in accordance with a second embodiment of the present invention. This interconnect system 100 shares many of the same components with the first interconnect system 30 described above, but differs substantially in the design of the bulkhead receptacle 103 and module assembly 105. As shown more clearly in the side view of FIG. 9, in contrast to the first interconnect system 30, the receptacle's 103 mating means for attaching the module assembly 105 includes an integrally-formed, rectangular platform 124 extending from the receptacle's passageway 143, which platform 124 engages a spring clip 126 included in the module assembly 105. In addition, the spring-load module cage 50 and PCB 122 ride on a spring-loaded mount 109 that relies on compression spring 184 (See FIGS. 18-21), instead of the spring washer.

The more open backside of the interconnect system 100 provides better heat dissipation for the transceiver module 48.

Figure 10:
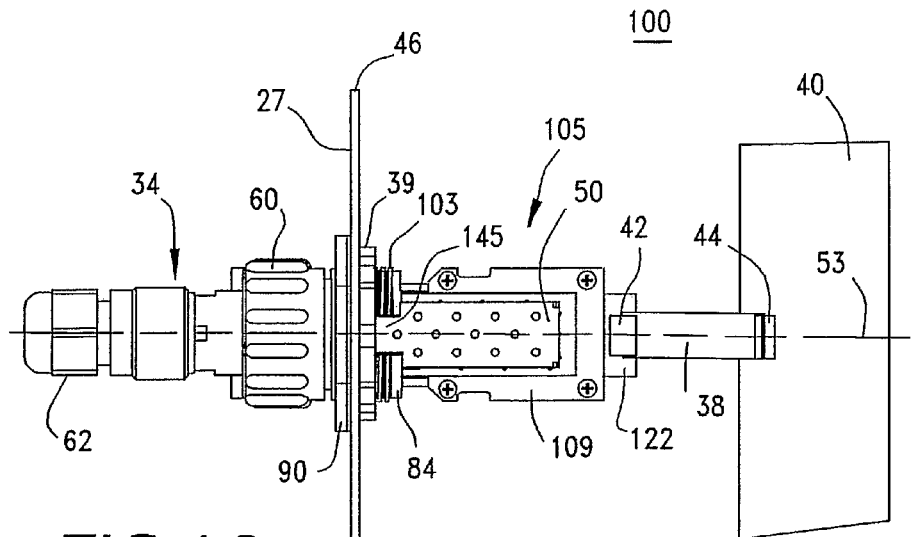
FIG. 10 is a top-down view of the mated interconnect system shown in FIG. 8.

FIG. 10 is a top-down view of the mated interconnect system 100 shown in FIG. 8. This view shows the top notch 145 formed in the bulkhead receptacle 103 for improved heat dissipation.

Figure 11:
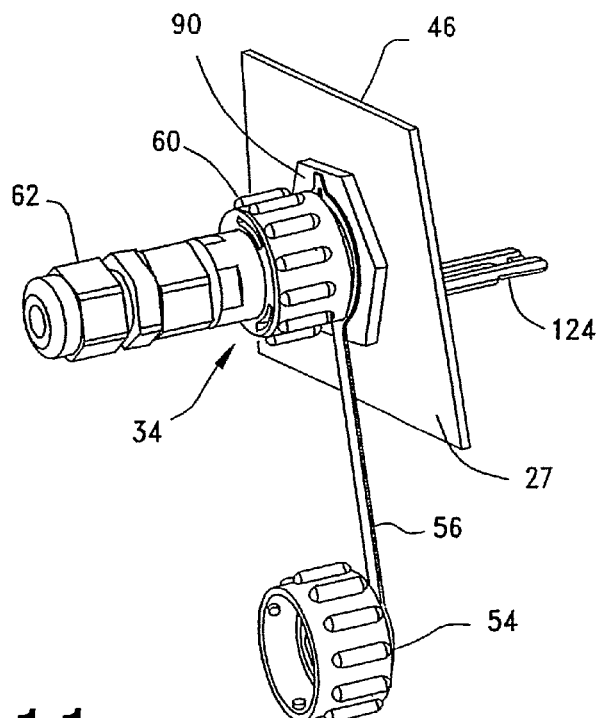
FIG. 11 is a second perspective view of the interconnect system of FIG. 8, showing the module assembly removed from the receptacle.

FIG. 11 is a second perspective view of the interconnect system of FIG. 8, showing the module assembly 105 removed from the receptacle 103.

Figure 12:
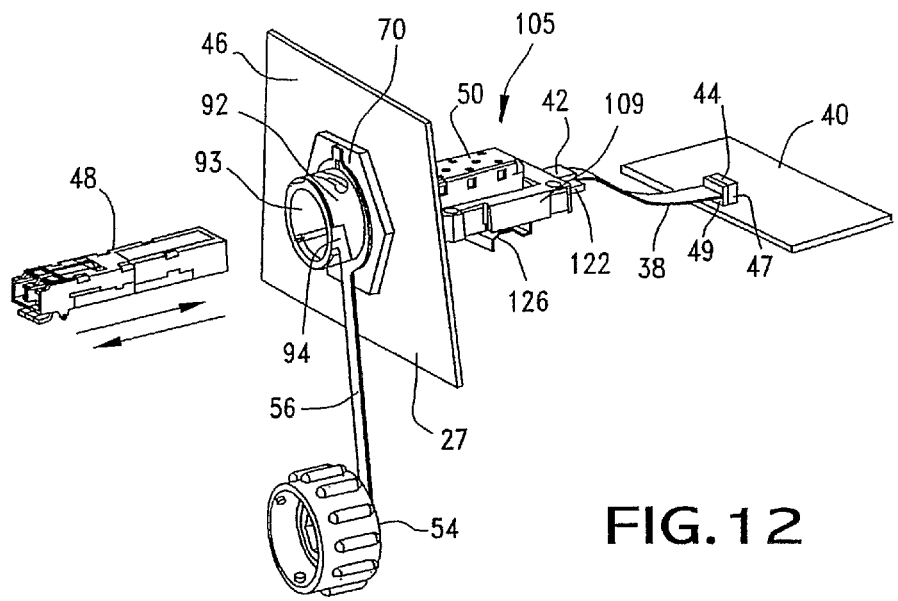
FIG. 12 is a perspective view of the interconnect system of FIGS. 8-10, illustrating a first procedure for removing/inserting the transceiver module.

As illustrated in FIGS. 12-13, the interconnect system 100 gives field technicians the option of conveniently plugging/unplugging the transceiver module 48 from either the front or back side of the panel 46. When attached to the platform 124, the module assembly 105 is positioned so that the cage's open end is accessible through the receptacle's exterior opening 93. By incorporating a detachable module assembly 105 into the system 100, technicians have the option of plugging/unplugging the transceiver module 48 either through the opening 93 or by removing the module assembly 105 from the receptacle 103. This allows installers to change out transceiver modules from either the front side or back side of an equipment panel.

FIG. 12 is a perspective view of the interconnect system 100, illustrating the front side method of plugging/unplugging the transceiver module 48. When the receptacle assembly 129 and module assembly 105 are mated, as shown in FIG. 12, the module 48 can be plugged/unplugged through the receptacle opening 93. This allows a technician to change out the module 48 from the front side 27 of the panel 46 by simply removing the optical connector 34.

FIG. 13 is a perspective view of the interconnect system 100, illustrating the back side method of plugging/unplugging the transceiver module 48. When the module assembly 105 is removed from the receptacle assembly 129, as shown in FIG. 13, the transceiver module 48 can be plugged or unplugged by a technician from the back side of the panel 46 without removing the optical connector 34. In addition, the module assembly 105 can be disconnected from the conductor 38 and swapped out if necessary. The ability to change out module assemblies makes for greater compatibility of the interconnect system 100 with modules of different types and from different vendors.

Figure 14C:
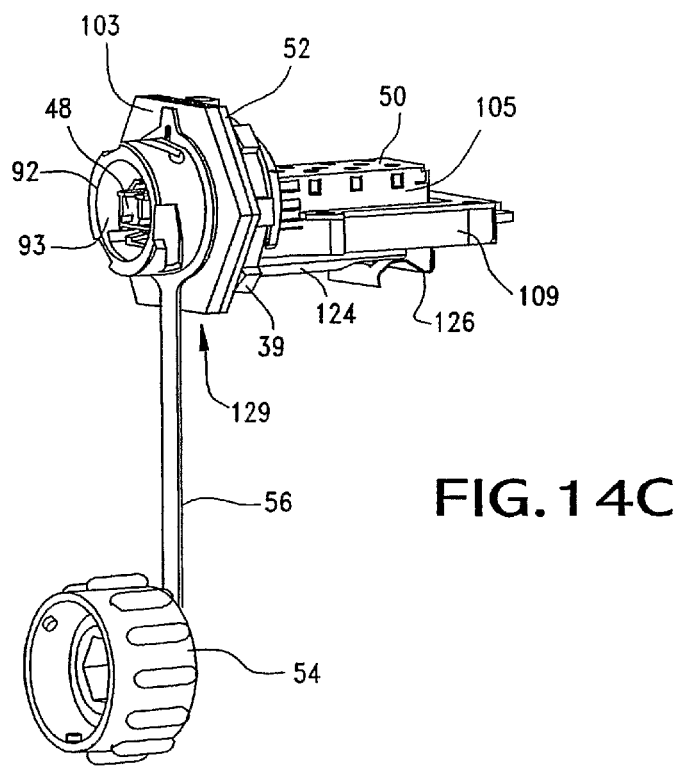
FIGS. 14A-C are perspective views showing mating of the receptacle and module assemblies of the second exemplary embodiment.
Figure 14A:
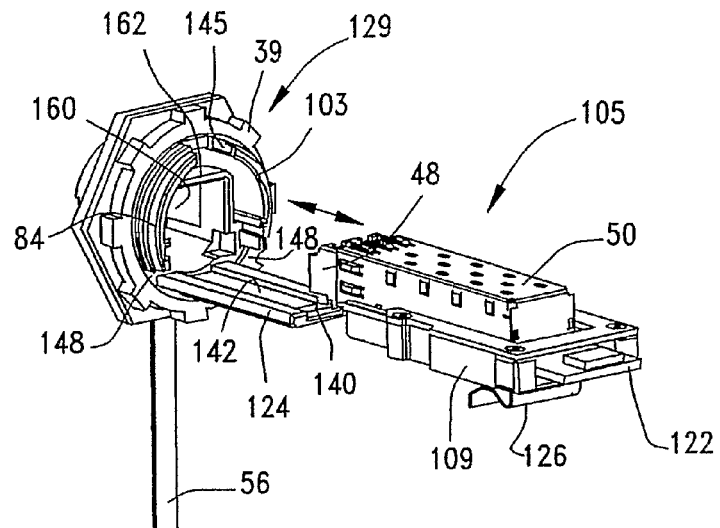
Figure 14B:
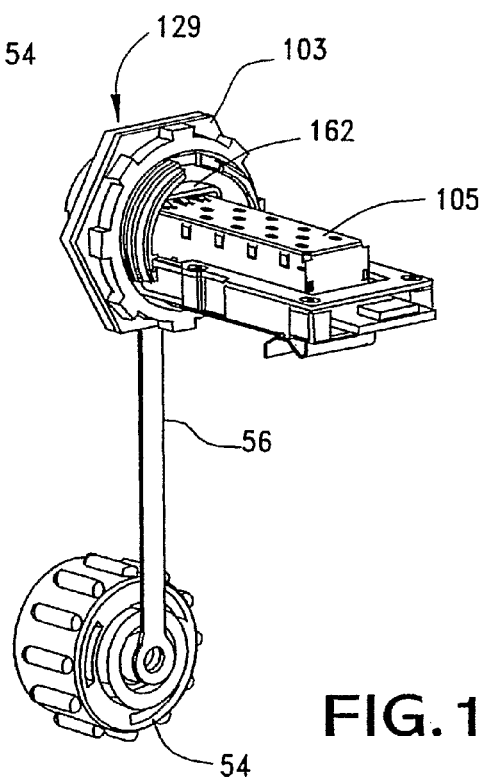

FIGS. 14A-C are perspective views showing mating of the receptacle and module assemblies 129,105 of the second exemplary embodiment. The bulkhead receptacle 103 has a rectangular passageway 162 formed therein having a rectangular opening 160 for snuggly receiving the front end of the module cage 50 when the module assembly is mated to the receptacle 103, as shown in FIGS. 14B-C. A pair of opposing side notches 148 are formed in the threaded portion 84 of the receptacle for accommodating the module assembly 105.

The receptacle's extended platform 124 includes a trough 142 formed along its center for engaging a corresponding rectangular guide 180 (See FIG. 17C) protruding from the bottom 171 of the spring-loaded mount 109. This arrangement prevents lateral movement of the module assembly 105. A rectangular hole 140 is formed in the trough 142 near the free end of the platform 124. The hole 140 securely engages the spring clip 126 to hold the module assembly 105 in place and prevent longitudinal movement thereof when the assemblies 129,105 are mated.

Figure 15:
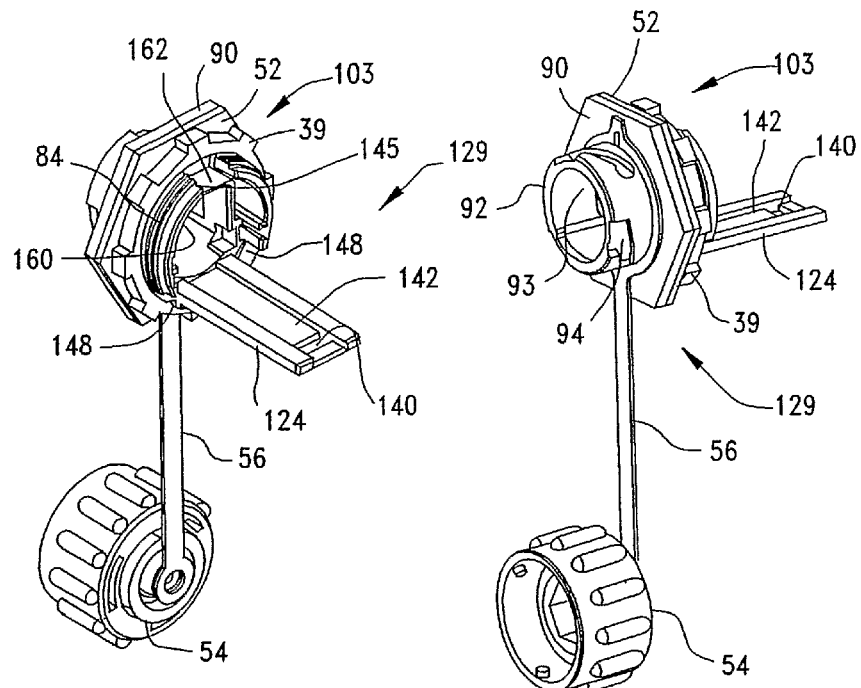
FIG. 15 shows perspective views of the receptacle of the second exemplary embodiment.

FIG. 15 shows perspective views of the receptacle assembly 129 of the second exemplary embodiment. The receptacle assembly 129 includes the bulkhead receptacle 103, locknut 39, gasket 52, and dust cap 54 and tether 56. The receptacle assembly 129 has a sealed panel feed-thru design for ease of installation into enclosures and equipment panels.

Figure 16:
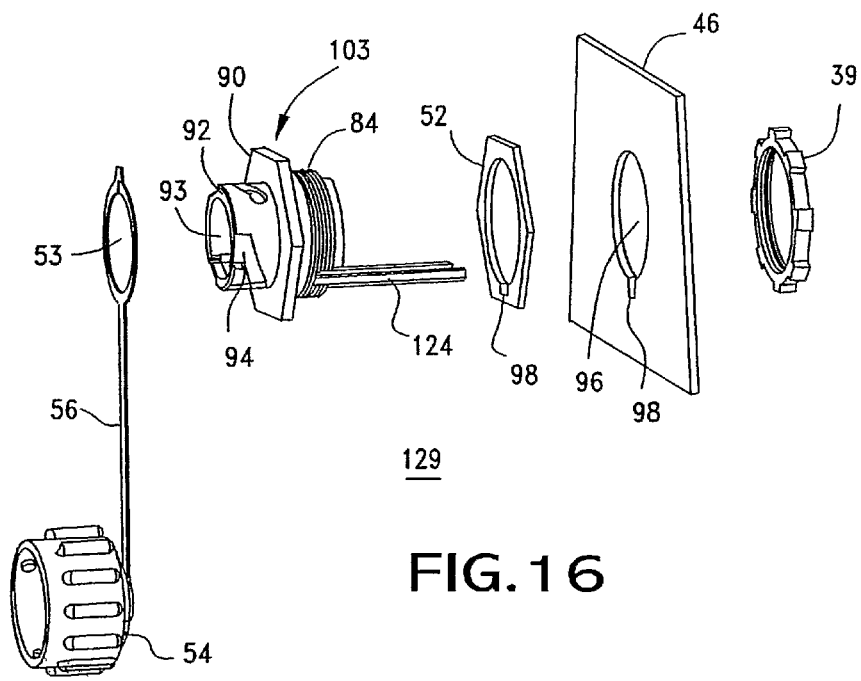
FIG. 16 is an exploded view of the receptacle of the second exemplary embodiment.

FIG. 16 is an exploded view of the receptacle assembly 129 of the second exemplary embodiment. The assembly 129 can be mounted directly into a panel cutout 90 to serve as a sealed feed-thru.

Figure 17A:
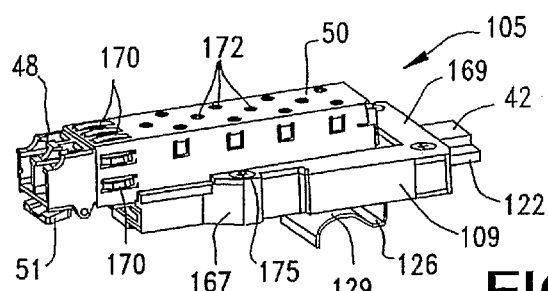
FIGS. 17A-D show perspective views of the module assembly of the second exemplary embodiment.
Figure 17B:
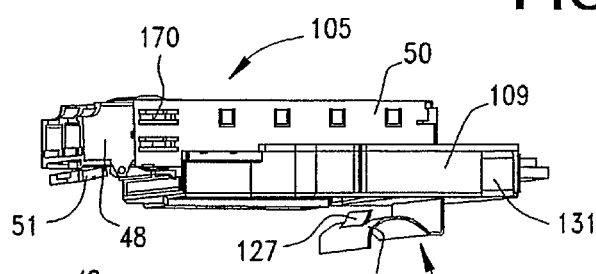
Figure 17C:
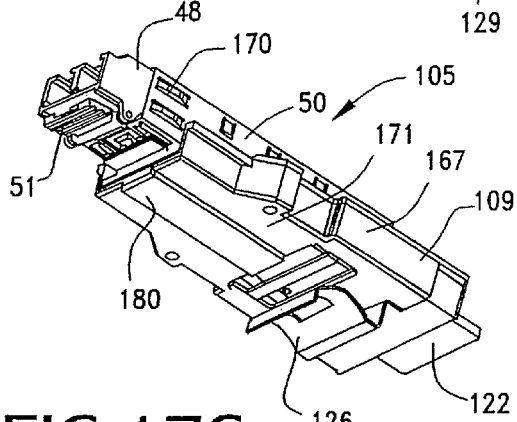
Figure 17D:
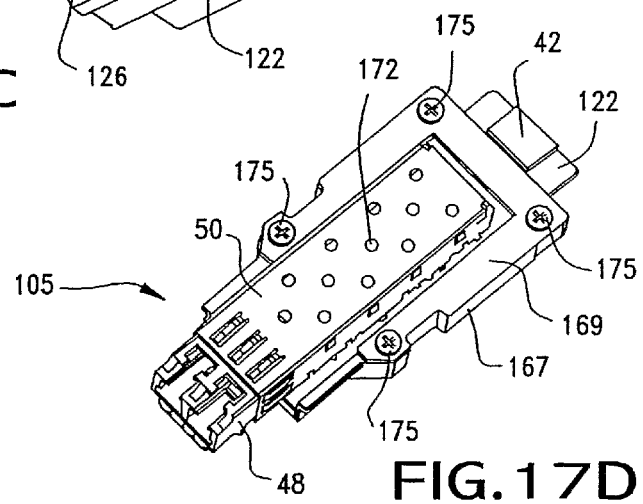

FIGS. 17A-D show perspective views of the module assembly 105 of the second exemplary embodiment. With reference to FIG. 17A, the module assembly 105 includes the module cage 50 mounted to the PCB 122, spring-loaded mount 109, and spring clip 126.

The spring-loaded mount 109 includes a housing 167 and a housing cover 169 removably fastened to the housing 167 with plural fasteners, such as screws 175.

The module cage 50 is preferably made of stamped sheet metal, and it includes plural holes 172 and resilient ribs 170 formed thereon, in conformance with SFP standards. The walls of the receptacle's rectangular passageway 162 (FIG. 15) are formed to securely engage the resilient ribs 170 upon insertion of the module cage 50 therein.

The PCB 122 extends from the back end of the housing 109 so that the connector 42 is readily accessible.

The spring clip 126 is preferably made of stamped spring steel, and it has a curved portion 129 and tang 127 for securely engaging the platform 124 and its hole 140 (FIG. 15).

The module 48 includes a standard SFP release lever 51 for releasing the module 48 from the cage 50.

Figure 18:
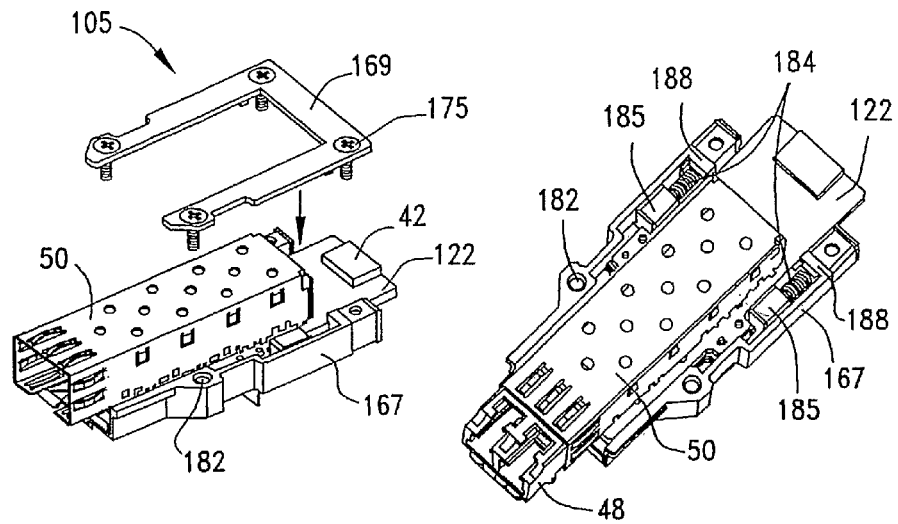
FIG. 18 shows perspective views of the module assembly of FIGS. 17A-D, with its housing cover removed.

FIG. 18 shows perspective views of the module assembly 105 with its housing cover 169 removed. These views show the threaded holes 182 formed in the housing 167 for receiving the screws 175, and the orientation of the compression springs 184 within the housing 167. The springs 184 are positioned between corresponding abutments 188 formed within the housing 167 and spring receptacles 185 formed on a movable member (slider) 200 (See FIG. 20) that slides longitudinally within the housing 167. The compression springs 184 are made using conventional spring steel and manufacturing techniques.

Figure 19:
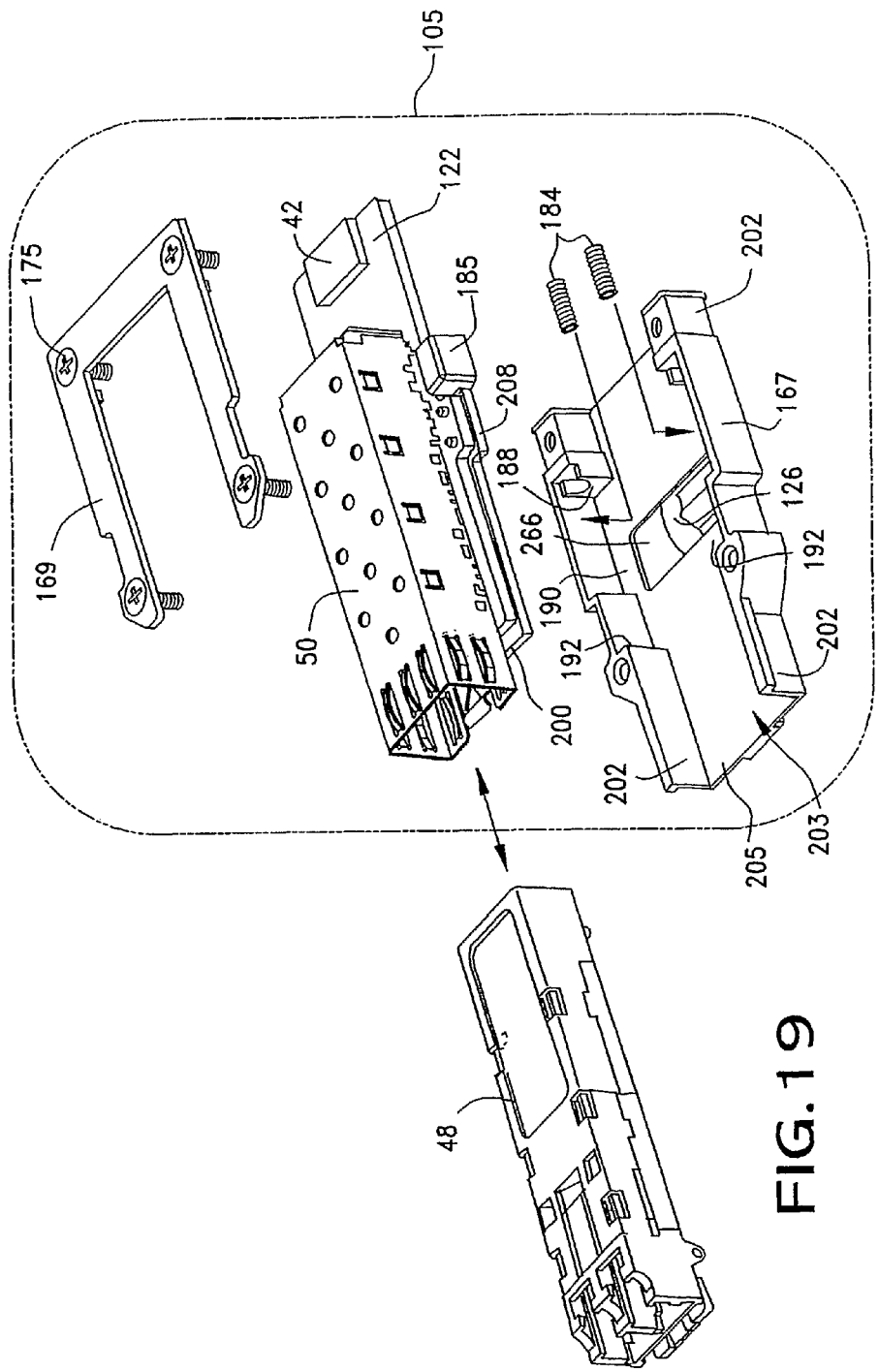
FIG. 19 is a partial exploded view of the of the module assembly of FIGS. 17A-D.

FIG. 19 is a partial exploded view of the of the module assembly 105. As shown in this figure, the housing 167 has a floor 203 and two substantially parallel longitudinal walls 202 extending upwardly from the floor 203 to form an open-ended trough 205.

Corners 192 formed along the walls 202 create a pair of stops within the trough 203 on interior sides of the housing walls 202. These stops limit the forward longitudinal movement of the slider 200.

The spring abutments 188 extend, respectively, from the interior sides of the housing walls 202 towards the middle of the trough 205. The abutments 188 and stop corners 192 are spaced apart along the walls 202 to form widened areas 190 along the interior of the walls 202 for receiving the springs 184, spring receptacles 185 and wider part 208 of the movable member 200.

The trough floor 203 has a rectangular hole 266 for receiving the spring clip tang 127. This permits a positive attachment between the clip 126 and the receptacle platform 124, where the module assembly 105 can not slide backwards off of the platform 124 after it has been attached.

FIG. 20 is a complete exploded view showing further details of the module assembly 105. The module cage 50 has downwardly extending legs 218 for being soldered into corresponding holes 220 in the PCB 122.

The slider 200 has a pair of parallel longitudinal bars 210 held together by first and second cross members 212,213. The parallel bars 210 are spaced apart so as to snuggly engage the interior sides of the housing walls 202 so as to reduce lateral movement of the slider 200. The front cross member 213 has a raised protrusion 214 for butting against the resilient ribs 170 of the module cage 50 providing EMI protection when module assembly 32 is mated with the receptacle 36.

The bars 210 have wider rear portions 208 for engaging the walls 202 in the widened areas 190 of the trough 205. The wider rear portions 208 form outward ledges 206 on the bars 210 for abutting against the corner stops 192 along the housing walls 202.

The spring receptacles 185 are integrally formed, respectively, at the ends of the bars 210. The spring receptacles 185 include small cavities formed on their backsides (not shown) for receiving the front portions of the compression springs 184.

Figure 21:
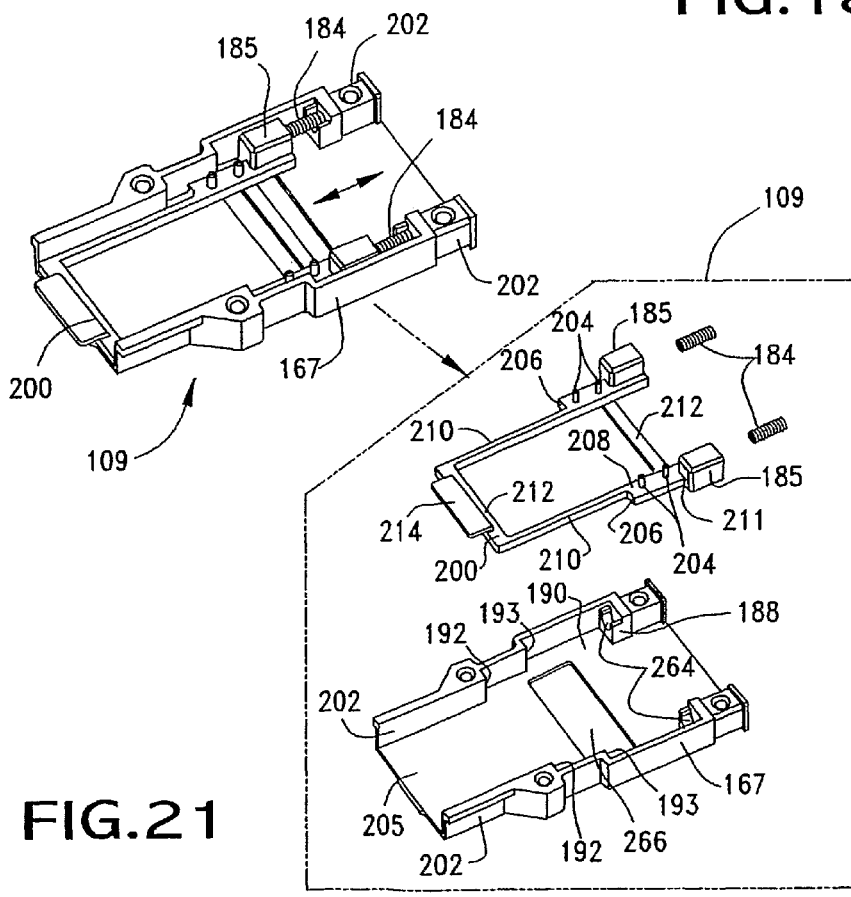
FIG. 21 shows perspective and exploded views of an exemplary spring-loaded mount.

The spring receptacles 185 are slightly wider than the bars' wider portions 208. This forms a front edge 211 on each receptacle 185 (FIG. 21). The spring receptacles 185 are designed so that their front edges 211 abut against a second pair of corner stops 193 on the inside of the housing walls 202 in unison with the abutment of the outward ledges 206 against the forward corner stops 192.

The bars 210 have four posts 204 extending upwardly for mounting the PCB 122. The PCB 122 is aligned on the posts 204 via thru-holes 216.

The PCB 122 can have an electrically conductive path between the module cage 50 and the posts 204 or other parts of the slider 200.

The spring clip 126 has upwardly extending arms 131 for clasping around the exterior of the rear end of the housing walls 202. The arms 131 include holes 250 corresponding to the housing screw holes 182 so that the clip 126 can be sandwiched between the housing 167 and its cover 169, and thus, securely screwed to the mounting platform 109.

FIG. 21 shows perspective and exploded views of the exemplary spring-loaded mount 109. As shown, movable slider 200 is sized and shaped to snuggly engage the interior sides of the housing walls 202 so as to limit lateral movement. The height of the spring receptacles 185 is selected so that their tops and bottoms engage the interior side of the housing cover 169 and the floor 203, respectively. This limits up and down movement of the slider 200.

The spring abutments 188 include semi-cylindrical notches 264 formed therein for cradling the compression springs 184.

In operation, the compression springs 184 bias the slider 200 toward the corner stops 192,193, and more generally, toward the optical connector 34. The spring biasing force allows the slider 200, as well as the PCB 122 and cage 50 attached to it, to move along the longitudinal axis 53 of the system 100 with a spring-loaded action, creating the spring-loaded cage. This configuration is advantageous because it allows the module assembly 105 to adjust the position of the cage 50 within the receptacle 103 so that it can accommodate multiple transceiver modules having different optical and/or mechanical planes.

The receptacle 103, mounting platform housing 167, cover 169 and slider 200 are preferably made of conductive material, such as a die cast metal, for forming an electrically conductive path between the panel 46, gasket 52, receptacle 103, module cage 50, and spring-loaded mount 109. This construction provides a ground path and significantly improved EMI protection.

The preceding detailed description has illustrated the principles of the invention using specific implementations of duplex LC-SFP type interconnect systems 30, 100. However, the invention is not limited to these particular implementations. For example, the inventive principles disclosed herein can be implemented in many other types of interconnect systems, such as purely electrical connector systems, simplex connector systems or connector systems having different shapes, sizes and mating characteristics. It is understood that the interconnect systems 30, 100 could be configured to contain any suitable number of optical fibers, electrical cables and terminal connectors without departure from the invention. The system could be configured so that more than one module cage could be housed in the receptacle. Further, other types of terminating connectors, such as optical SC-type connectors, MPO or the like, and other types of modules, such as XFP transceivers, electrical/electrical transceiver modules and/or non-SFP modules, can be used without departing from the principles of the invention.

Therefore, while one or more specific embodiments of the invention have been described, it will be apparent to those of ordinary skill in the art that many more embodiments are possible that are within the scope of this invention. Further, the foregoing detailed description and drawings are considered as illustrative only of the principles of the invention. Since other modifications and changes may be or become apparent to those skilled in the art, the invention is not limited the exact construction and operation shown and described, and accordingly, all suitable modifications and equivalents are deemed to fall within the scope of the invention.

What is claimed is:

1. An interconnect system, comprising:
a receptacle, the receptacle including a flange mated to an exterior side of an equipment panel, the exterior side being open to the environment, the panel having a through-hole for receiving the receptacle, the receptacle further including a means for mounting the receptacle to the equipment panel, the means being secured by the flange, the receptacle being adapted to mate to a connector to form an environmentally-sealed connection between the receptacle and the connector; and
a transceiver module located within a module cage assembly, a portion of the transceiver module being received within the receptacle;
wherein the transceiver module is accessible without removing the receptacle from the equipment panel.

2. The interconnect system of claim 1, wherein the transceiver module is selected from the group consisting of a Small Form-factor Pluggable transceiver module and an XFP module.

3. The interconnect system of claim 1, further comprising a flexible electrical conductor forming an electrically conductive path between a module inserted into the module cage and a host PCB.

4. The interconnect system of claim 1, wherein the receptacle and module cage are each made of conductive material.

5. The interconnect system of claim 4, wherein an electrically conductive path is formed between the receptacle and the module cage.

6. The interconnect system of claim 1, wherein the connector is an optical connector.

* * * * *